US011119300B2

(12) United States Patent
Mercer

(10) Patent No.: US 11,119,300 B2
(45) Date of Patent: Sep. 14, 2021

(54) STEREO MICROSCOPE WITH SINGLE OBJECTIVE

(71) Applicant: VISION ENGINEERING LIMITED, Surrey (GB)

(72) Inventor: Graham Peter Francis Mercer, Hampshire (GB)

(73) Assignee: VISION ENGINEERING LIMITED, Surrey (GB)

( * ) Notice: Subject to any disclaimer, the term of this patent is extended or adjusted under 35 U.S.C. 154(b) by 0 days.

(21) Appl. No.: 16/754,593

(22) PCT Filed: Oct. 5, 2018

(86) PCT No.: PCT/GB2018/052858
§ 371 (c)(1),
(2) Date: Apr. 8, 2020

(87) PCT Pub. No.: WO2019/073209
PCT Pub. Date: Apr. 18, 2019

(65) Prior Publication Data
US 2020/0285035 A1 Sep. 10, 2020

(30) Foreign Application Priority Data

Oct. 10, 2017 (GB) .................................... 1716603

(51) Int. Cl.
G02B 21/22 (2006.01)
H04N 13/302 (2018.01)
(Continued)

(52) U.S. Cl.
CPC ........... *G02B 21/22* (2013.01); *G02B 21/365* (2013.01); *G02B 21/368* (2013.01); *G06T 5/001* (2013.01);
(Continued)

(58) Field of Classification Search
CPC .... G02B 21/22; G02B 21/365; G02B 21/368; G02B 21/361; G02B 30/34; H04N 13/302;
(Continued)

(56) References Cited

U.S. PATENT DOCUMENTS 3,879,107 A * 4/1975 Chaban .................. G02B 30/35
359/472
3,992,112 A * 11/1976 Adrion .................. G02B 21/18
356/432
(Continued)

FOREIGN PATENT DOCUMENTS

EP 0072652 A1 * 2/1983 ............. G02B 21/22
EP 0662625 A2 * 7/1995 ............. G02B 21/18
(Continued)

OTHER PUBLICATIONS

International Search Report for corresponding Application No. PCT/GB2018/052858, dated Nov. 19, 2018.
(Continued)

*Primary Examiner* — Robert J Hance
(74) *Attorney, Agent, or Firm* — Renner, Otto, Boisselle & Sklar, LLP

(57) ABSTRACT

An assembly for use in a microscope having an objective assembly including an aperture. The assembly includes a lens and a beamsplitter. configured to form a respective aperture image on each of two optical paths. The assembly further includes, on each optical path, a stop structure located on a plane of the respective aperture image, so as to block a portion of the respective aperture image in order to provide an exit pupil, such that a stereoscopic image of an object viewed through the microscope is produceable by the combination of the images of the object visible through each exit pupil. Image sensors are configured to capture an image visible through the respective exit pupil and to output a
(Continued)

digital image. A digital image processor is configured to apply a correction to the respective digital image output by each image sensor, based on the position of the respective stop structure.

14 Claims, 5 Drawing Sheets

(51) Int. Cl.
  *H04N 13/239* (2018.01)
  *G02B 21/36* (2006.01)
  *G06T 5/00* (2006.01)
  *H04N 5/225* (2006.01)

(52) U.S. Cl.
  CPC ......... *H04N 5/2253* (2013.01); *H04N 13/239* (2018.05); *H04N 13/302* (2018.05); *G06T 2207/10056* (2013.01)

(58) Field of Classification Search
  CPC .... H04N 13/239; H04N 5/2253; G06T 5/001; G06T 2207/10056
  See application file for complete search history.

(56) References Cited

U.S. PATENT DOCUMENTS

| | | | | |
|---|---|---|---|---|
| 5,649,897 A | * | 7/1997 | Nakamura | A61B 1/00193 600/111 |
| 5,964,696 A | * | 10/1999 | Mihalca | A61B 1/00193 348/45 |
| 6,275,335 B1 | * | 8/2001 | Costales | G02B 30/24 359/464 |
| 2002/0080481 A1 | | 6/2002 | Tachihara et al. | |
| 2002/0131170 A1 | * | 9/2002 | Costales | H04N 13/214 359/464 |
| 2014/0267632 A1 | * | 9/2014 | Ward | G02B 21/361 348/47 |
| 2016/0291302 A1 | * | 10/2016 | Schnitzler | G02B 21/0044 |
| 2017/0045727 A1 | | 2/2017 | Yang | |

FOREIGN PATENT DOCUMENTS

| | | | | |
|---|---|---|---|---|
| EP | 0715198 A | | 6/1996 | |
| GB | 2 379 280 A | | 3/2003 | |
| GB | 2 497 092 A | | 6/2013 | |
| GB | 2497092 A | * | 6/2013 | ........... G02B 21/361 |
| WO | WO-0106282 A1 | * | 1/2001 | ............. G02B 21/22 |
| WO | WO-2012054481 A1 | * | 4/2012 | ......... G02B 23/2415 |

OTHER PUBLICATIONS

International Preliminary Report on Patentability for corresponding Application No. PCT/GB2018/052858, dated Jan. 16, 2020.
GB Search Report for corresponding Application No. GB1716603.4, dated Mar. 29, 2018.
C. Hammond: "Principles of stereoscopy in the single objective binocular microscope",Quekett Journal of Microscopy,vol. 37, Jan. 1, 1996 (Jan. 1, 1996), pp. 566-574.
Rainer Wolf: "A novel beam-splitting microscope tube for taking stereo-pairs with full resolution Nomarski or phase contrast technique, or with epifluorescence", Journal of Microscopy, vol. 153, No. 2, Feb. 1, 1989 (Feb. 1, 1989), pp. 181-186.

* cited by examiner

Right channel

Left channel

STEREO MICROSCOPE WITH SINGLE OBJECTIVE

FIELD OF THE INVENTION

The invention relates to stereoscopic microscopes. In particular, the invention relates to an assembly for a microscope, a stereoscopic microscope incorporating that assembly, and a method of retrofitting a microscope with that assembly.

BACKGROUND

In order to aid with the description of the background and the present disclosure, several terms will now be defined:
"mono"—(of an image) appearing "flat" or 2D to an observer, or (of a device) producing a mono image;
"stereo"—(of an image) appearing to have depth or 3D to an observer, or (of a device) producing a stereo image;
monocular—viewed with only one eye;
binocular—viewed with both eyes.

FIG. 1 illustrates a typical monocular mono compound microscope (not to scale—length reduced for clarity). The microscope comprises an objective assembly 101 (generally a compound lens made up of several complex lenses) having an aperture stop 102. The objective assembly 101 is configured such that it produces an image of the object 111 at infinity. A tube lens 103 focusses light from the objective assembly 101 to produce an intermediate image 112 within the microscope. An eyepiece 104 magnifies the intermediate image 112, producing a larger virtual image. This virtual image is viewed through an exit pupil 113, which is a reduced image of the aperture stop 102

A simple binocular stereo microscope can be provided by effectively placing two of the microscopes of FIG. 1 side by side and angled with respect to each other to provide the parallax required for stereo. However, as the objective assemblies 101 are bulky, the working distance of the microscope (i.e. the distance between the objective assembly 101 and the object 111) must be large so that there is sufficient space for the objective assemblies 101 to be placed side-by-side. The resolution of the microscope is inversely correlated with the aperture and depth of field, and so stereo microscopes with this structure cannot deliver the useful magnification of a monocular mono microscope.

FIG. 2 illustrates a binocular mono microscope—i.e. a microscope which produces a mono image that can be viewed with both eyes. The objective assembly 201, aperture 202, and tube lens 203 are equivalent to those in the monocular mono microscope. A beamsplitter 221 is provided within the microscope tube, splitting the light along two paths. Each path comprises an eyepiece 204 and mirrors 222, arranged to direct the light to the observer and to ensure that the length of each path is the same. A separate intermediate image 212 is produced on each path, and each path has its own exit pupil 214—located such that a viewer can place an eye at each pupil to view the image.

The experience of using a binocular mono microscope is rather like looking at a photograph—the viewer is able to see the image with both eyes, but there is no parallax and therefore no depth information and it can be difficult to determine the elevation of features of the image. As such, binocular mono systems may be more comfortable for the user, but they do not replicate the advantages of stereo systems with regards to depth perception. However, because only a single objective assembly is used, the aperture and magnification is not limited in the same way as for a stereo microscope.

SUMMARY

According to a first aspect of the invention, there is provided an assembly for use in a microscope having an objective assembly including an aperture. The assembly comprises a lens and a beamsplitter. The lens and the beamsplitter are configured to form a respective aperture image on each of two optical paths. The assembly further comprises, on each optical path, a stop structure. Each stop structure is located on a plane of the respective aperture image, so as to block a portion of the respective aperture image in order to provide an exit pupil, such that a stereoscopic image of an object viewed through the microscope is produceable by the combination of the images of the object visible through each exit pupil. The assembly further comprises two image sensors and a digital image processor. Each image sensor is configured to capture an image visible through the respective exit pupil and to output a digital image. The digital image processor is configured to apply a correction to the respective digital image output by each image sensor, the correction being based on the position of the respective stop structure.

According to a further aspect of the invention, there is provided a stereo microscope comprising an objective assembly having an aperture and an assembly according to the first aspect.

According to a yet further aspect of the invention, there is provided a method of retrofitting a microscope. The method comprises removing an eyepiece of the microscope; and placing an assembly according to the first aspect such that the lens is in the location from which the eyepiece was removed.

Further embodiments are presented in claim 2 et seq.

DETAILED DESCRIPTION

Figure 1:
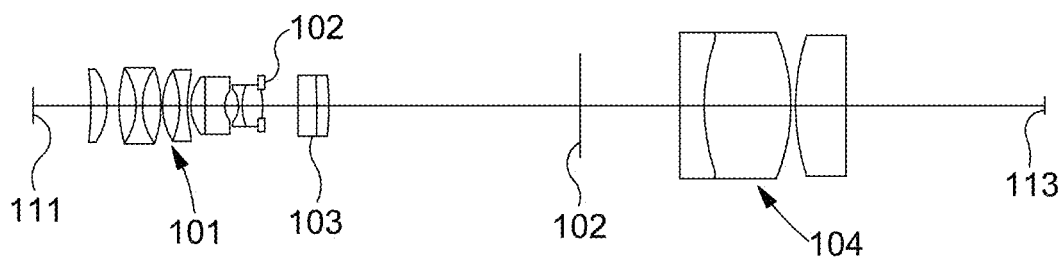
FIG. 1 is a schematic illustration of a monocular mono microscope.
Figure 2:
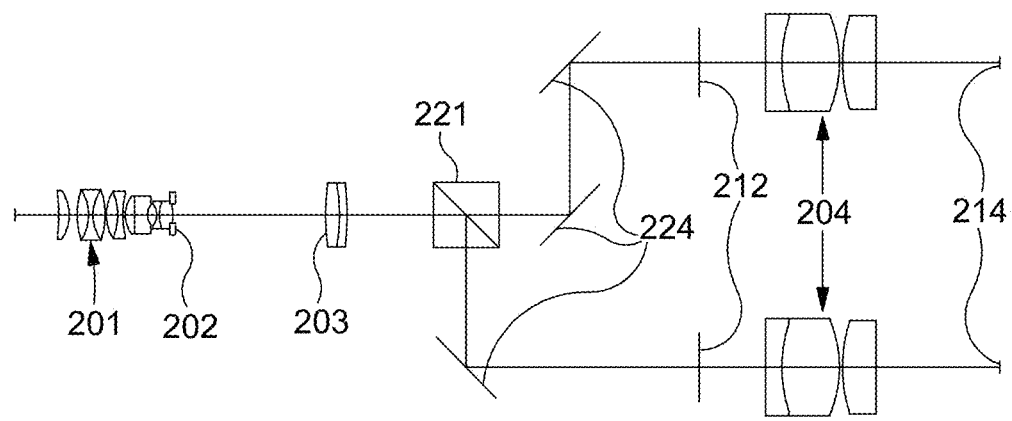
FIG. 2 is a schematic illustration of a binocular mono microscope.
Figure 3A:
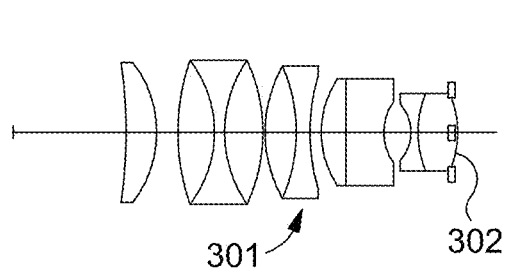
FIG. 3A is a schematic illustration of a stereo microscope having a split aperture.
Figure 3B:
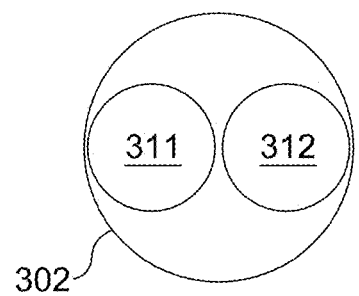
FIG. 3B is a schematic front view of the split aperture of FIG. 3.

In order to provide a stereo image, a microscope must provide an image to each eye from different perspectives (at an angle to mimic normal stereo vision). In previous designs, this has been done by providing separate objective assemblies, each providing a separate image, one for each eye of the user. This results in the reduced magnification possible with stereo microscopes compared to mono microscopes. An alternative means of providing the different perspectives is shown in FIG. 3A. The objective assembly 301 comprises an aperture stop 302 which is illustrated in FIG. 3B. The aperture stop 302 is divided into two separate apertures 311 and 312. The light from each aperture 311, 312 is then routed via separate optics 303 to the eyepieces (not shown).

Figure 4A:
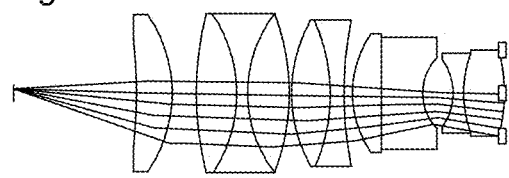
FIGS. 4A and 4B show the ray paths through the objective assembly and aperture of the microscope of FIG. 3.

FIGS. 4A and B show the ray paths through each of apertures 311 and 312, respectively. As can be seen, the perspective of each aperture is different—meaning that the images resulting from each aperture can be directed to different eyes of a viewer so that they are perceived as a stereo image.

However, providing a split aperture raises several challenges. Firstly, the aperture itself is small and generally embedded within the objective assembly, and so the manufacture required to produce such an aperture is complex. Secondly, the apertures 311 and 312 are each smaller than the single aperture 102. This results in the resolution of the microscope being lower than can be achieved by a single aperture (though the achievable resolution is still greater than for a stereo microscope with two objectives), as well as dimming and distortion of the image compared to a single aperture. This also results in the exit pupils being smaller than they would be with a single aperture, making such a microscope impractical for actual use (as the observer must keep their head extremely still to avoid losing the image and the optical performance of the eye is reduced when the iris aperture is not completely filled).

Figure 5:
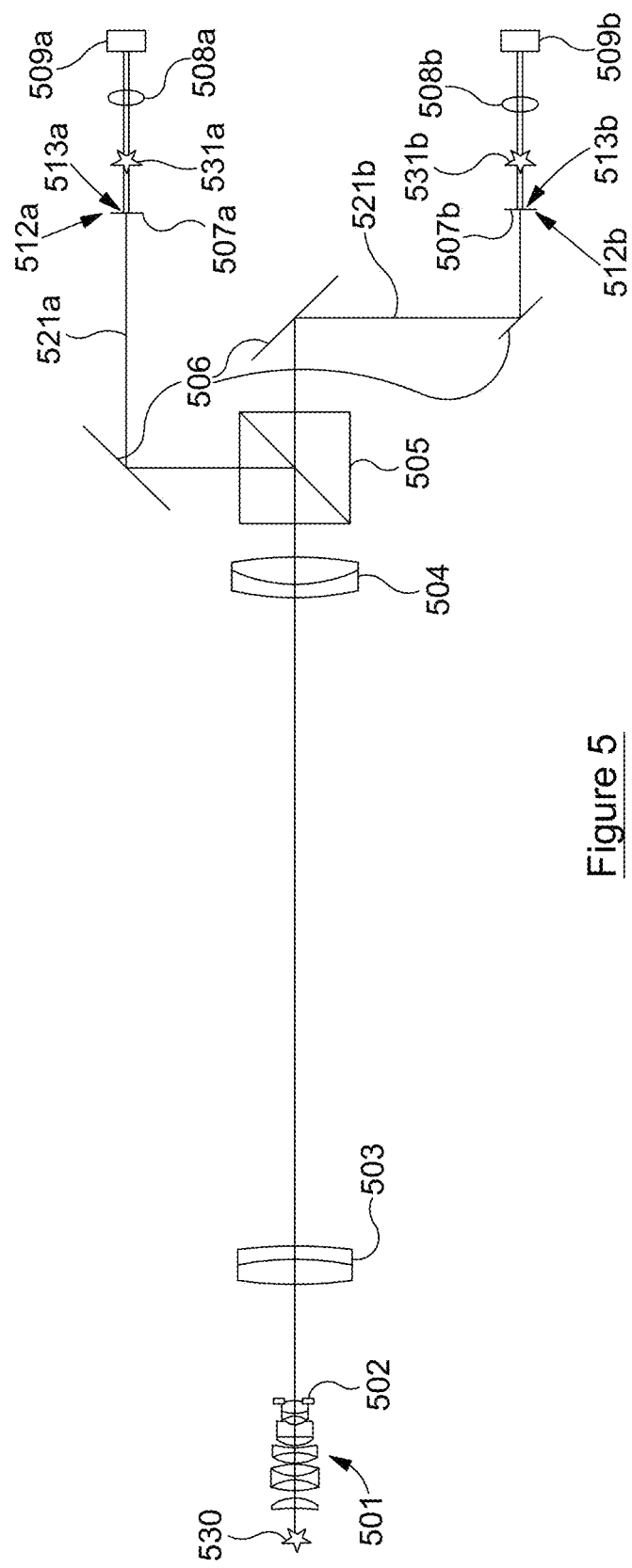
FIG. 5 is a schematic illustration of a stereo microscope.

FIG. 5 is a schematic diagram of a microscope configured to provide split apertures. The microscope comprises an objective assembly 501 having a (single) aperture 502, and a tube lens 503, arranged to provide an image of an object 530. The microscope further comprises an intermediate lens 504, a beamsplitter 505, and mirrors 506. The lens 504, beamsplitter 505, and mirrors 506 together form respective images 512a, 512b of the aperture 502 (hereinafter referred to as an aperture image) on each of two optical paths 521a, 521b. A respective stop structure 507a, 507b is provided in the plane of each aperture image 512a, 512b, such that each stop structure 507a, 507b blocks a different portion of the respective aperture image, defining an exit pupil 513a, 513b. Eyepiece lenses 508a, 508b and image sensors 509a, 509b are located such that the image sensors capture a real image of the object 520 through each of the exit pupils 513a, 513b. In practice, further optics (not shown) will be required beyond the aperture images to produce real images 531a, 531b of the object beyond the exit pupils 513a, 513b which are then viewed through the eyepieces 508a, 508b. The stop structures 507a, 507b are positioned such that the respective images captured by the image sensors 509a, 509b can be displayed on a stereoscopic viewer as a stereo image of the object, i.e. with one image sensor providing the left eye view and the other providing the right eye view, due to the positioning of the respective stop structures.

Figure 4B:
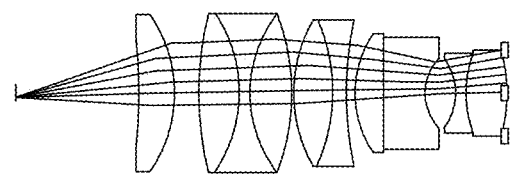

The aperture image 512a, 512b will be larger than the aperture itself, and each stop structure only needs to provide one of the perspectives. Therefore, the stop structures can be manufactured much more easily than a split aperture as shown in FIG. 4, while having the same effect of providing a stereo image.

Figure 6A:
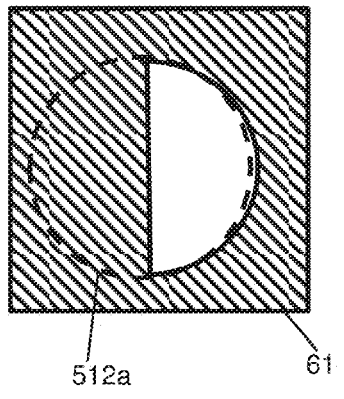
FIGS. 6A to C show several possibilities for the shape of the stop structure in the microscope of FIG. 5.
Figure 6B:
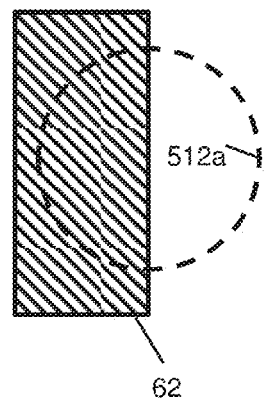
Figure 6C:
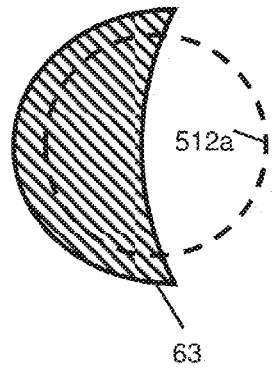

The stop structure 507a, 507b may be any suitable shape. Several possibilities are shown in FIGS. 6A to 6C. For example, the stop structure 507a, 507b may have an aperture which defines the exit pupil (61) or may be a "curtain" which blocks only one side of the aperture image 512a, 512b with a flat (62) or curved (63) edge. In order to provide a full, pure stereo image, the stop structures 507a, 507b must be located so that the exit pupil for each eye corresponds to a portion of the aperture that is not in the other exit pupil. A less pronounced stereo effect is produced if the exit pupils overlap slightly (i.e. each contains a portion of the aperture which is in the other exit pupil, and a portion which is not in the other exit pupil). If the exit pupils overlap completely, then the result is a binocular mono image.

Figure 7A:
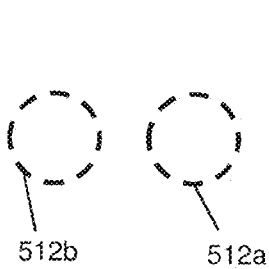
FIGS. 7A to C illustrate the effect of different stop structure positions in the microscope of FIG. 5.
Figure 7A:
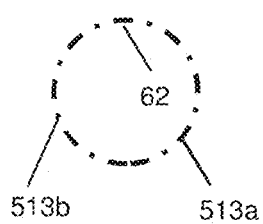
Figure 7A:
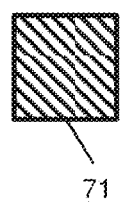
Figure 7B:
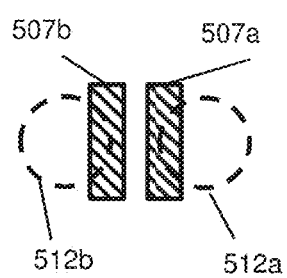
Figure 7B:
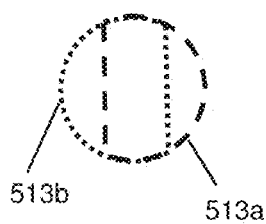
Figure 7B:
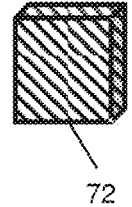
Figure 7C:
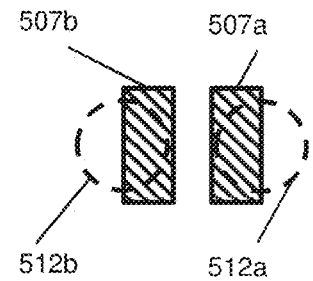
Figure 7C:
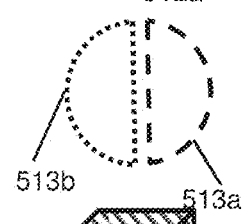

FIGS. 7A, 7B, and 7C illustrate the effect of different stop structure positions for "curtain"-style stop structures. The same principles apply for other shapes of stop structure. The top part of each figure shows the aperture images and stop structures, the middle part shows the resulting exit pupils (overlaid so that the differences can be seen), and the bottom part shows a representation of the degree of stereoscopy (as much as can be presented in a 2D medium). As shown in FIG. 7A, where there is no stop structure 507a, 507b occluding the aperture images 512a, 512b, the exit pupils 513a, 513b for each eye correspond exactly and a binocular mono image 71 results. This can also occur for stop structures comprising a symmetric aperture, positioned such that the exit pupils correspond exactly. As shown in FIG. 7C, where each stop structure 507a, 507b occludes the respective aperture image 512a, 512b such that the exit pupils 513a, 513b are completely separate regions of the aperture, a full stereo image 73 results. As shown in FIG. 7B, where each stop structure 507a, 507b occludes a separate portion of each aperture image 512a, 512b, such that the exit pupils 51a, 513b are overlapping regions of the aperture but there is a portion of each exit pupil which does not correspond to a portion of the other exit pupil, then a less pronounced stereo image 72 results.

The resolution of the image is dependent on the dimensions of the effective aperture formed by the aperture 502 and the stop structure 507a, 507b (i.e. the aperture which, if located at the aperture 502, would form the exit pupil 513a, 513b), with the resolution being lower the smaller the effective aperture is (though the exact value depends on the shape of the effective aperture). As such, the positioning of the stop structure 507a, 507b is a balance between resolution and stereo effect.

Figure 10:
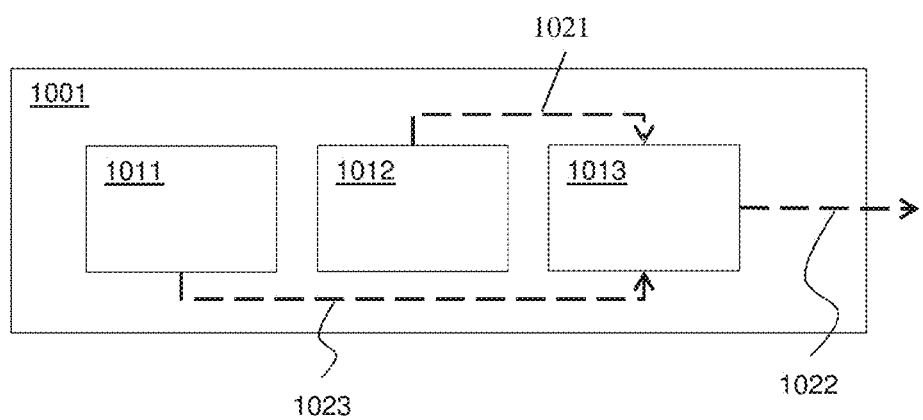
FIG. 10 is a schematic illustration of a microscope system.

Other effects of the stop structures on the stereo image produced can be compensated for prior to display of the images. FIG. 10 shows a schematic illustration of the microscope 1001. The microscope 1001 comprises stop structures 1011 and image sensors 1012 as described above. Additionally, the microscope comprises a digital image processor 1013 which takes the output 1021 of the image sensors 1012 and output of 1023 of the stop structure control, and adjusts it to compensate for unwanted changes to the image resulting from adjustments to the stop structures 1011, with the adjustments being performed on the basis of the shape and position 1023 of the stop structures. The digital image processor then provides the corrected image as an output 1022 from the microscope (e.g. to a stereoscopic display).

For example, the intensity of the image will vary with the position of the stop structures 1011. This occurs both due to different amounts of area of the aperture 502 being blocked, and due to intensity variations across the aperture 502 (meaning that there will be intensity variations even for stop structures such as that of FIG. 6A that always block the same amount of the aperture area). The intensity will depend on both the position and shape of the stop structures.

The aperture 502 will have an intensity profile, which is a function describing how much each point on the aperture contributes to the intensity of the final image. The reduction in intensity resulting from the stop structures can be determined by comparing the integral of this intensity profile over the effective aperture formed by each stop structure with the integral of the intensity profile over the whole aperture 502. The digital image processor may then adjust the brightness of the output of each image sensor to ensure that the intensity is apparently constant for the user between different stop structure positions.

The intensity variation will also depend on the shape of the stop structures. The microscope may be provided with multiple different sets of stop structures from which the stop structures to be used are selected. The digital image processor should be configured to apply a different relationship between stop structure position and image brightness adjustment for each set of stop structures. The set of stop structures may be identified by the user in software of the digital image processor, or automatic identification may occur when the stop structures are installed in the microscope (e.g. by providing optical or electronic identifiers on the stop structures which interface with sensors on the microscope, or by other suitable means). Where the microscope is intended to work with only a single type of stop structure, the digital image processor only requires a single relationship between stop structure position and image brightness.

Similarly, occluding different regions of the aperture 502 will affect the distortion of the image (due to lens aberrations and other optical effects). This distortion may also be corrected by the digital image processor, with the parameters of the transformation used being dependent on the stop structure shape and position.

The relationship between stop structure position (and shape, if multiple sets of stop structures may be used) and the digital image processing required may be preconfigured, e.g. with a lookup table programmed into the digital image processor, or it may be calculated on-the-fly from the known parameters. The lookup table or predetermined function may be obtained via a calibration step, e.g. measuring intensity, image distortion, or other properties for a range of stop structure positions, and using this data (with suitable interpolation) to compute a lookup table.

Figure 8:
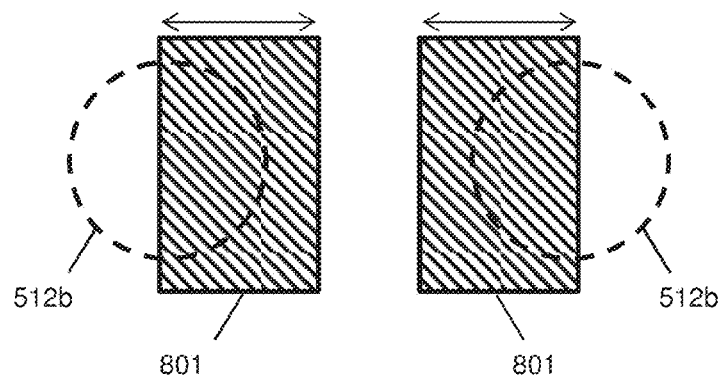
FIG. 8 is a schematic illustration of a movable stop structure.

The stop structure may be adjustable to allow the user to transition from mono to stereo views, and control the degree of stereoscopy. A setup for achieving this is shown in FIG. 8. Each stop structure includes a moveable curtain 801, which is can be introduced into the optical path in a controllable manner so as to occlude a variable amount of the aperture image 512a, 512b. The optical path for the other image has an equivalent system, and the curtains are coupled such that each occludes the same proportion of the respective aperture image 512a, 512b. The moveable curtain 801 can be adjusted from a position in which each occludes none of the aperture image (resulting in a binocular mono image) to a position in which the exit pupils are non-overlapping portions of the aperture image 512a, 512b (resulting in a pure stereo image). The moveable curtains 801 are configured to move such that each blocks an equal sized portion of the respective aperture image 512a, 512b, on opposite sides of the respective image.

The setup of FIG. 8 allows a continuous and progressive transition between stereo and binocular mono modes of the microscope, without interruption of the image viewed by the observer. It has been surprisingly found through the use of this apparatus that when transitioning smoothly from a stereo image to a higher resolution mono image, the user experiences a sensation of depth with the mono image which is not present if the mono image is viewed without such a transition. This means that the system described above allows much of the advantage of the stereoscopic image to be retained, while also having the higher resolution of the mono image.

From the above description, it will be noted that the structure of the single objective stereo microscope from the objective assembly 501 up to but not including the lens 504 is the same as that of the conventional mono microscope from the objective assembly 101 up to but not including the eyepiece 104. The head and eyepiece assembly of many commercially available microscopes are removeable, and therefore it is possible to retrofit an existing mono microscope (whether binocular or monocular) with a system comprising the lens 504, beamsplitter 505, mirrors 506, and stop structures 507a, 507b, where the system is configured to attach in place of the head and eyepiece assembly of the mono microscope such that the lens 504 is in the light path of the microscope—i.e. in the path which light from the object takes through the microscope. The original mono microscope may or may not apply optical corrections such as field curvature, chromatic aberration etc using the eyepiece—in systems for retrofitting to microscopes where these corrections are applied, the lens 504 and/or eyepieces 508a, 508b may be configured to apply equivalent corrections.

The image sensors may be CCDs or other image sensors. A further advantage of the use of image sensors is that there is no requirement for the exit pupils to be arranged to precisely align with the viewers left and right eyes to view them, which allows for simplified structure of the microscope.

Figure 9:
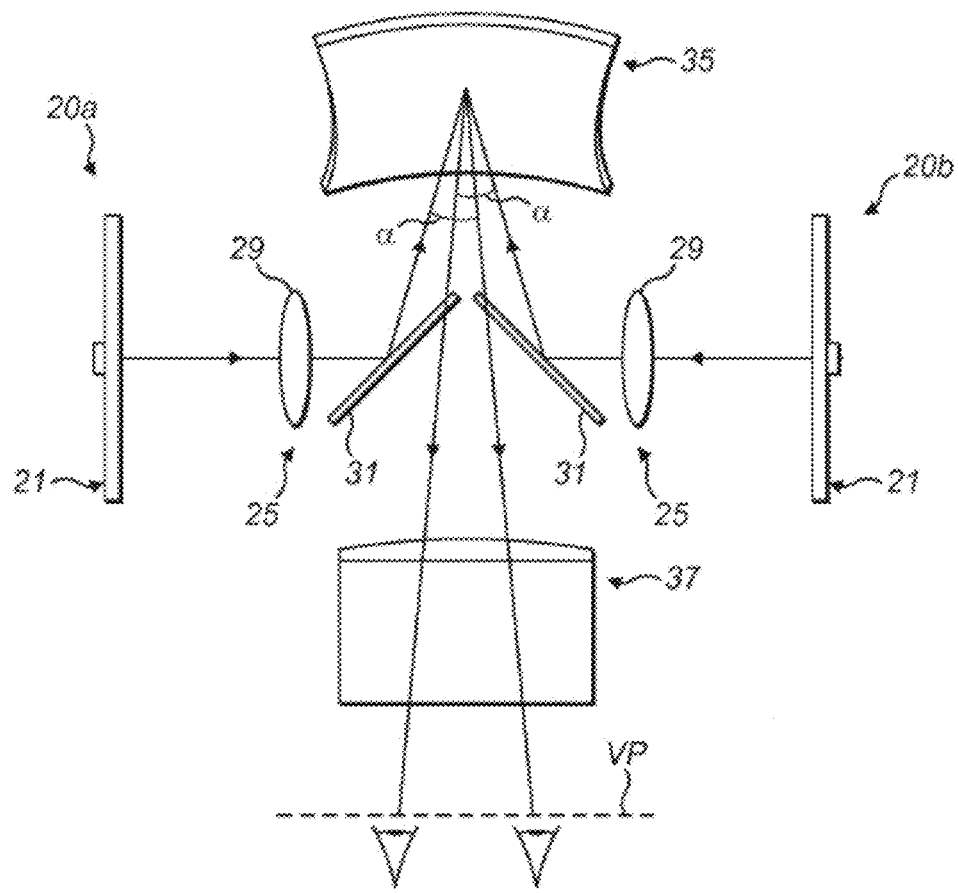
FIG. 9 is a schematic illustration of a stereoscopic viewing apparatus.

One example of a stereoscopic display is that described in GB2524609, and shown in FIG. 9. The display comprises two projectors 20a and 20b, which display the left eye and right eye images respectively. Each projector comprises a display 21 and an optical arrangement 25 (comprising one or more lenses 29 and/or mirrors 31) for providing a focused image of each of the left eye and right eye images on a mirror 35. The mirror 35 reflects the exit pupils of the projectors onto a viewing plane (VP) for viewing by an observer, optionally via a viewing lens 37. Optical components other than the mirror 35 and viewing lens 37 may be placed out of the direct line of sight of the observer, to give a clean viewing experience.

Other examples of stereoscopic displays include "virtual reality" headsets, 3D displays with active glasses (i.e. glasses which are synchronised to the refresh rate of the TV, and block each eye for alternate frames), and 3D displays with passive glasses (e.g. displays that present each of the left eye image and right eye image as a different polarisation, and are used with glasses that have a corresponding polarisation filter for each eye).

An advantage of using an image sensor coupled to a stereoscopic display rather than having the user directly observe the microscope through the exit pupils is that the size of the exit pupils available for the viewer is not limited by the microscope optics, and is not restricted by the stop structures 507a, 507b. Larger exit pupils give a more comfortable viewing experience. This is due to the fact that, where the exit pupils are small, the user must keep their head in a specific position to see the stereo image. Where the exit pupils are smaller than a certain size, as would likely be the case where stop structures are used, the user may have difficulty seeing the image at all, as the human eye does not function well when the exit pupil is smaller than the pupil of the eye. In fact, with the optical systems as used in most existing microscopes, the exit pupil is already smaller than the entrance pupil of the user's eye, which limits the resolution, and causes any inhomogeneity in the eye (e.g. floaters) to have a significantly greater effect on the user's vision.

It will be appreciated that the above disclosure is by way of example only, and variations are possible while still holding to the principle of the disclosure. It will also be appreciated that particular features are not dependent on each other unless otherwise stated.

The invention claimed is:

1. An assembly for use in a microscope having an objective assembly including an aperture, the assembly comprising a lens and a beamsplitter;
   wherein the lens and the beamsplitter are configured to form a respective aperture image on each of two optical paths;
   the assembly further comprising, on each optical path, a stop structure;
   wherein, when the assembly is positioned relative to the aperture such that each aperture image is located in the plane of the respective stop structure, each stop structure blocks a portion of the respective aperture image in order to provide an exit pupil, such that a stereoscopic image of an object viewed through the microscope is produced by the combination of the images of the object visible through each exit pupil;
   the assembly further comprising:
      two image sensors, each image sensor being configured to capture an image visible through the respective exit pupil and to output a digital image;
      a digital image processor configured to apply a correction to the respective digital image output by each image sensor in order to compensate for a distortion related to the position of the stop structure, the correction being based on the position of the respective stop structure;
   wherein the correction comprises performing a spatial transformation of the respective image to correct for distortions introduced by optics structures of the microscope and/or assembly, the spatial transformation having at least one parameter dependent on the position of the respective stop structure.

2. The assembly according to claim 1, wherein the correction comprises adjusting brightness of the respective image by a proportion based on the position of the respective stop structure.

3. The assembly according to claim 1, wherein:
   the stop structures are one set of a plurality of sets of stop structures, wherein the sets of stop structures are swapped into the assembly; and
   the digital image processor is configured to apply the correction based on the position of the respective stop structure and on which set of stop structures is present.

4. The assembly according to claim 1, wherein each stop structure comprises a circular aperture.

5. The assembly according to claim 1, wherein each stop structure comprises a curtain configured to block one side of the respective aperture image.

6. The assembly according to claim 5, wherein each curtain has a straight edge where it blocks the aperture.

7. The assembly according to claim 1, wherein each stop structure is moveable from a position in which the aperture image is not blocked to a position in which the exit pupils are non-overlapping portions of the aperture image.

8. The assembly according to claim 7, wherein each stop structure is continuously moveable.

9. The assembly according to claim 7, wherein each stop structure is moveable so as to provide a transition between a mono and stereo image captured by the image sensors without interruption of the image.

10. The assembly according to claim 1, wherein each image sensor is a CCD.

11. The assembly according to claim 1, and further comprising a stereoscopic display configured to present the corrected digital images to the user as a stereoscopic image.

12. The assembly according to claim 11, wherein the stereoscopic display comprises two projectors, and a mirror, each projector being configured to provide a focused image of the corrected digital image captured by the respective image sensor on the mirror, and the mirror being configured to relay exit pupils of the projectors to a viewing plane for viewing by an observer.

13. A stereo microscope comprising:
   an objective assembly having an aperture; and
   an assembly according to any preceding claim 1.

14. A method of retrofitting a microscope, having an objective assembly including an aperture, with an assembly including a lens and a beamsplitter, the method comprising:
   removing an eyepiece of the microscope; and
   placing the assembly relative to the aperture such that the lens is placed in the light path of the microscope and the lens and the beamsplitter form a respective aperture image on each of two optical paths, wherein:
      the assembly further includes, on each optical path, a stop structure; and
      each of the aperture images is located in the plane of the respective stop structure;
   blocking a portion of the respective aperture image with each stop structure in order to provide an exit pupil;
   producing a stereoscopic image of an object viewed through the microscope by combining the images of the object visible through each exit pupil;
   capturing and outputting as a digital image with each of two image sensors an image through each of the exit pupils; and
   apply with a digital image processor a correction to the respective digital image output by each image sensor in order to compensate for a distortion related to the position of the stop structure, the correction being based on the position of the respective stop structure;
   respective image to correct for distortions introduced by optical structures of the respective image to correct for distortions introduced by optical structures of the microscopy and/or assembly, the spatial transformation having at least one parameter dependent on the position of the respective stop structure.

* * * * *

UNITED STATES PATENT AND TRADEMARK OFFICE
CERTIFICATE OF CORRECTION

PATENT NO. : 11,119,300 B2
APPLICATION NO. : 16/754593
DATED : September 14, 2021
INVENTOR(S) : Graham Peter Francis Mercer It is certified that error appears in the above-identified patent and that said Letters Patent is hereby corrected as shown below:

In the Claims

Claim 1, Column 7, Line 42 – "respective image" should read "respective digital image".

Claim 2, Column 7, Lines 48-49 – "respective image" should read "respective digital image".

Claim 14, Column 8, Line 56 – "respective image" should read "respective digital image".

Claim 14, Column 8, Lines 56-61 should read "wherein the correction comprises performing a spatial transformation of the respective digital image to correct for distortions introduced by optical structures of the microscope and/or assembly, the spatial transformation having at least one parameter dependent on the position of the respective stop structure.".

Signed and Sealed this
Twenty-third Day of April, 2024

Katherine Kelly Vidal
*Director of the United States Patent and Trademark Office*